(12) United States Patent
Josten et al.

(10) Patent No.: US 6,194,596 B1
(45) Date of Patent: Feb. 27, 2001

(54) POLYSILOXANES CONTAINING CARBONATE GROUPS AND MODIFIED WITH LINEAR POLYESTERS AND THEIR USE AS ADDITIVES IN COATINGS

(75) Inventors: Wolfgang Josten, Königswinter; Stefan Silber, Krefeld, both of (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/520,349

(22) Filed: Mar. 7, 2000

(30) Foreign Application Priority Data

Mar. 9, 1999 (DE) .............................. 199 10 975

(51) Int. Cl.⁷ ...................................... C07F 7/08
(52) U.S. Cl. ...................... 556/437; 556/440; 528/26; 106/287.14
(58) Field of Search ................. 556/437, 440; 528/26; 106/287.14

(56) References Cited

U.S. PATENT DOCUMENTS

| 5,488,123 | 1/1996 | Engelhardt et al. . |
| 5,552,223 | 9/1996 | Mikami et al. . |
| 5,608,026 | 3/1997 | Hoover et al. . |
| 5,932,677 | * 8/1999 | Hoover et al. .................. 528/26 |
| 6,066,700 | * 5/2000 | Konig et al. ................. 528/26 X |

FOREIGN PATENT DOCUMENTS

| 2001945 | 9/1970 | (DE) . |
| 3427208 A1 | 2/1986 | (DE) . |
| 3502928 A1 | 7/1986 | (DE) . |
| 3535283 A1 | 4/1987 | (DE) . |
| 0 146 827 A2 | 7/1985 | (EP) . |
| 0 208 734 | 12/1990 | (EP) . |
| 0 764 676 A2 | 3/1997 | (EP) . |

OTHER PUBLICATIONS

Yilgör et al., "Polysiloxane Containing Copolymers: A Survey of Recent Developments", Polym. Sci. 86, 1 (1988).

* cited by examiner

Primary Examiner—Paul F. Shaver
(74) Attorney, Agent, or Firm—Frommer Lawrence & Haug LLP

(57) ABSTRACT

The invention relates to polysiloxanes containing carbonate groups and modified with linear polyesters and to their use as additives for coatings, especially radiation-curing coating materials.

10 Claims, No Drawings

POLYSILOXANES CONTAINING CARBONATE GROUPS AND MODIFIED WITH LINEAR POLYESTERS AND THEIR USE AS ADDITIVES IN COATINGS

RELATED APPLICATIONS

This application claims priority to German application No. 199 10 975.3, filed Mar. 9, 1999, herein incorporated by reference.

BACKGROUND OF THE INVENTION

1. Field of the Invention

The invention relates to polysiloxanes containing carbonate groups and modified with linear polyesters and to their use as additives in coatings.

The compounds of the invention promote leveling, generate antiadhesive properties, and increase the lubricity and scratch resistance of the coatings to which they are added.

Coatings in the sense of the present invention are, in particular, coating materials. These materials can be formulated in a variety of ways and can thus, inter alia, be clearcoats, or coating materials containing pigments or dyes. Their liquid phase can comprise organic solvents and/or water, as is known prior art depending on the binders used. However, the coating materials of the invention need not necessarily include a liquid phase but may also be what are known as powder coating materials. The coating materials may also include the conventional, prior art additives, such as, for example, wetting agents and dispersants, fillers, defoamers, etc., and may cure in accordance with different prior art processes. With particular advantage the compounds of the invention can be used in heat-curable coating materials, in which the polysiloxanes containing carbonate groups and modified with linear polyesters are particularly stable under the curing conditions up to 300° C.

2. Description of the Related Art

It is generally known that polysiloxanes are added to coating materials in order to provide dirt-repelling surfaces or to enhance the lubricity and scratch resistance of such surfaces. Over time, a large number of polysiloxanes and organomodified siloxanes as well have become established in the market. Polyoxyalkylene-modified polysiloxanes in particular have been found suitable as additives for optimizing the surface properties. Polyoxyalkylenes, however, are unstable at temperatures of 150° C. or more under the effect of oxygen. Under such conditions the polymer chain begins to break down, leading in many cases, as a result of the release of insufficiently organomodified polysiloxanes, to defects in the coating composition and/or in particular on the surface of the coating. This can be countered by utilizing the widely known increased thermal stability of polyester-modified siloxanes in comparison with alkylene- or oxyalkylene-modified siloxanes, as described, for example, by I. Yilgor, J. E. McGrath, Adv. Polym. Sci., 86, 1 (1988).

A large number of publications deal with the production and use of silicone-modified polyesters, which generally are branched, for the preparation of binders. Such compounds generally contain reactive groups which allow the overall mixture to undergo a crosslinking and hence curing reaction. In a large number of cases these functional groups are attached to silicon, as taught, for example, by U.S. Pat. No. 5,552,223. Silicone-modified binders of this kind are not comparable with the polysiloxanes containing carbonate groups and modified with linear polyesters, as described in this invention, since they constitute a separate class of binder and are not used as additives which are effective in small amounts.

A similar diversity is found in respect of the production and use of silicone polyesters as elastomers and thermoplastics, as set out, for example, in EP-A-0 146 827. Polysiloxane-polyester block copolymers described therein are optimized with respect to their mechanical properties for subsequent use in shaping plastics and are, likewise, incomparable either analogously or in respect of their activity with the polysiloxanes containing carbonate groups and modified with linear polyesters that are described in this invention.

The preparation of linear polysiloxanes having a blockwise construction and modified with linear polyesters is normally carried out by hydrosilylation in order to obtain a linkage between an alkenyl-functional polyester segment and a hydrosilyl-functional polysiloxane, as set out in DE-A-34 27 208. A particular disadvantage in this case, however, is the complex preparation of an alkenyl-functional polyester segment suitable for the hydrosilylation reaction.

Other processes for preparing linear polysiloxanes having a blockwise construction and modified with linear polyesters do not feature this disadvantage and have been prior art for a considerable time. For example, the reaction of chloro- or dimethylamino-functional polysiloxanes to give polysiloxanes modified with linear polyesters is described in DE-A-20 01 945. It is also possible to start from carboxyl-functional polysiloxanes, as set out in DE-A-35 02 928.

For the preparation of such materials, linear, aminoalkyl-functional polysiloxanes, for example, are first of all reacted with dialkyl dicarboxylates. This leads to the formation of linear $\alpha,\omega$-alkyl carboxylate-functionalized polysiloxanes which are linked via amide bridges and which are then reacted further with linear diols and linear dialkyl dicarboxylates. DE-A-34 27 208 and DE-A-35 35 283 describe how, even starting from hydroxy-functional polysiloxanes, it is possible to prepare linear polysiloxanes having a blockwise construction and modified with linear polyesters, by direct condensation and/or addition reactions with further diol components and carboxylic acids or derivatives thereof.

Very similarly, U.S. Pat. No. 5,488,123 also shows how, starting from linear hydroxyalkylpolysiloxanes, polycondensates of the $(AB)_nA$ type, with entirely random distribution, are produced in a condensation reaction at final temperatures of up to 260° C. with the addition of diols and dicarboxylic acids or derivatives thereof.

The above-described processes by means of polycondensation and/or addition reaction have significant disadvantages which lie in particular in the use in some cases of expensive or difficult-to-obtain polysiloxane derivatives and temperatures of up to 260° C., in association with the pronounced inherent coloration of products obtained in this way. Processes which envisage a reaction at relatively low temperatures and relatively short reaction times readily lead to the formation of nonhomogeneous polymers owing to nonuniformly distributed polysiloxane blocks and polyester blocks. The consequence of this is the formation of siloxane-rich adducts having comparatively low degrees of modification, alongside corresponding polyester-rich adducts. Products so lacking in homogeneity exhibit an inadequate application profile, especially in terms of mixing problems and defects of the coating surface.

This problem can be circumvented by the use of $\alpha,\omega$-hydroxycarboxylic acids and/or their lactones, since in this case, owing to the effective monofunctionality of the polyester unit, the reaction proceeds in a more controllable manner and leads in a targeted fashion to A-B-A polyester-polysiloxane-polyester triblock copolymers.

Polycaprolactone-polysiloxane-polycaprolactone-silicone polyesters in particular have been a subject of intensive investigation, as can be seen, for example, in I. Yilgor, J. E. McGrath, Adv. Polym. Sci., 86, 1 (1988). Corresponding products are freely available commercially (for example, Tegomer® HSi-6420 and HS-6440, Th. Goldschmidt AG, Essen). EP-B-0 208 734, DE-A-34 27 208 and DE-A-35 35 283 also show comprehensively the diverse possibilities of the ring-opening polymerization of lactones on hydroxy-functional polysiloxanes and hydroxy-functional polyoxy-alkylenepolysiloxanes. The synthesis starts from linear hydroxyalkylpolysiloxanes, which are reacted with α,ω-hydroxycarboxylic acids and/or their derivatives (for example, ε-caprolactone). The essential advantage of this synthesis sequence (use of the α,ω-hydroxycarboxylic acids and their derivatives, which permit an extremely strict A-B-A triblock copolymer structure) is at the same time also its fundamental disadvantage, since there is, accordingly and logically, a restriction to only these α,ω-hydroxycarboxylic acids and their derivatives as polyester raw materials. Therefore, in accordance with the commercial availability of these α,ω-hydroxycarboxylic acids and their derivatives, the value of this synthesis strategy is considerably restricted, since only a few raw materials are available and, therefore, there are severe restrictions on the preparation of compounds tailored to specific applications.

In order in particular to pursue a variable synthesis strategy, it is possible, starting from ready-made polysiloxane blocks and polyester blocks, to make use of a linking unit to join the two structural elements. Starting, for example, from polyesters and from polysiloxanes which are in each case hydroxyalkyl-functional, a large number of potential linkage elements are possible. Mention may be made, by way of example, of dicarboxylic acids and their derivatives, bisepoxy compounds and diisocyanates. In the case of the dicarboxylic acids and their derivatives, important disadvantages of these linkage elements are the above-mentioned high temperatures and the problematic course of reaction, which leads to nonhomogeneous products. Dicarboxylic dianhydrides, such as pyro-mellitic anhydride, for example, although reacting at low temperatures, nevertheless result in an unwanted acidification of the molecule as a whole. In the case of the bisepoxides as linkage element, the reactivity of the secondary hydroxyl group which is formed in the course of the addition reaction cannot be suppressed, resulting in crosslinked structures. Diisocyanates of low molecular mass are toxicologically objectionable and are complicated to control on the industrial scale. Less toxicologically unacceptable, protected and/or relatively high molecular mass derivatives either require high temperatures again, so that unwanted side reactions (as a result, for example, of allophanate formation) lead to crosslinking, or else the structural effect of the comparatively high molecular mass diisocyanate leads to a marked influencing of the overall properties of the polyester siloxane prepared in this way.

It has surprisingly now been found that polysiloxanes containing carbonate groups and modified with linear polyesters do not have the disadvantages described above and can be prepared in a simple manner by the reaction of carbonates with hydroxy-functional poly-siloxane segments and polyester segments.

In this case, the use of polyester blocks which are widely available commercially enables the polysiloxanes to be modified in an extremely economic and diverse manner. Furthermore, the products obtained in this way also feature particularly low inherent coloration and outstandingly effective technical performance.

The reaction between polysiloxanes and carbonic acid derivatives for the preparation of polycarbonate-polysiloxane block copolymers is prior art. It is described, inter alia, in EP-A-0 764 676 and U.S. Pat. No. 5,608,026. However, polycarbonate-polysiloxane block copolymers prepared in this way all contain carbonate segments joined directly to one another, of the following general structure

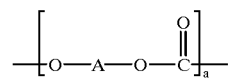

in which A is a divalent branched or linear, aliphatic, cycloaliphatic or aromatic organic radical with or without heteroatoms and a is a number which is at least 3.

The polycarbonate segment, which is generally obtained by nucleophilic substitution of diols on phosgene or on cyclic carbonates, is, however, always an essential constituent of the overall molecule in order to achieve a desired pattern of properties.

SUMMARY OF THE INVENTION

The present invention provides, in contrast, polysiloxanes containing carbonate groups and modified with linear polyesters, of the formula I

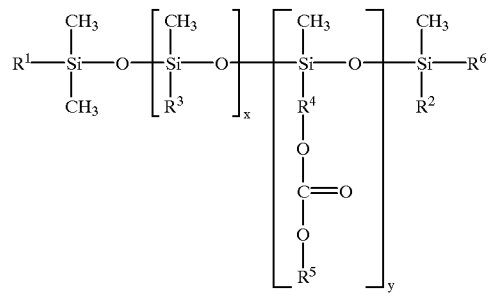

where
$R^1$=CH$_3$ or $R^4$—O—CO—O—$R^5$,
$R^2$=CH$_3$ or $R_3$,
$R^3$=alkyl group having, preferably, 1 to 24 carbon atoms, it being possible for up to about 25 mol % of these alkyl groups to be replaced by aryl groups or arylalkylene groups such as phenyl groups and/or phenylalkenyl groups, in which the alkenyl groups can contain 2 to 4 carbon atoms,
$R^4$=(CH$_2$)$_n$ or (CH$_2$)$_n$—O—(CH$_2$)$_m$,
n, m=2 to 20,
$R^5$=an aliphatic and/or cycloaliphatic and/or aromatic polyester group containing at least three —CO—O— and/or —O—CO— groups and having not more than one Zerevitinov hydrogen atom and an average molecular weight M$_n$ of from about 200 to about 5000,
$R_6$=CH$_3$ or $R^4$—O—CO—O—$R^5$,
x=3 to 300 and
y=0 to 50,
and where the average molecule includes at least one group $R^4$—O—CO—O—$R^5$ and the ratio of the number of groups $R^4$—O—CO—O—$R^5$ to the number x is from about 1:2 to about 1:50.

Preferably, $R^1$ denotes alkyl groups having 1 to 18 carbon atoms.

It is also preferred for the groups —CO—O— and/or —O—CO— in the groups $R^5$ to be joined by way of divalent hydrocarbon groups having 2 to 12 carbon atoms and containing ether groups if desired.

The invention additionally provides polysiloxanes containing (meth)acryloyl groups and modified with linear polyesters, which are obtainable by preferably enzymatically catalyzed esterification or trans-esterification of the abovementioned modified siloxanes with (meth)acrylic acid and/or (meth)acrylic acid derivatives, and also provides for their use as additives for radiation-curing coating materials.

The invention also provides for the use of polysiloxanes containing carbonate groups and modified with linear polyesters as additives for coatings.

The essential properties of the polysiloxanes of the invention modified with linear polyesters are determined, therefore, by the choice of the organopolysiloxanes and of the linear polyesters. The carbonate serves as a universal linkage element, with the particular advantages described above and hereinbelow.

In accordance with the invention, the carbonate used for linkage has the following general structure

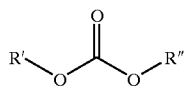

where R' and R" can be identical or different and can be an organic radical having, preferably 1 to 24 carbon atoms.

The carbonate used in accordance with the invention may also be of the following general cyclic structure

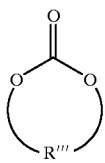

where R''' can be an organic radical having, preferably 1 to 24 carbon atoms.

Examples of functional siloxanes used to prepare the polysiloxanes containing carbonate groups and modified with linear polyesters in accordance with the invention are illustrated, by way of example, by the formulae below:

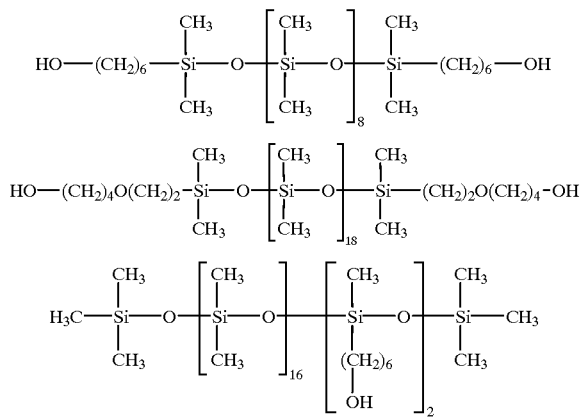

-continued

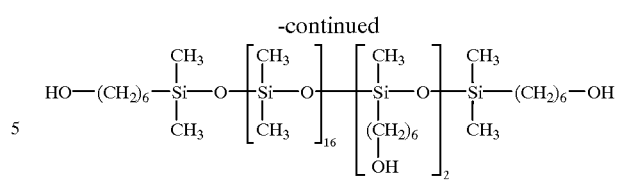

As the polyester component it is possible to use α,ω-hydroxy-functional linear polyesters which are commercially inexpensive and are obtainable by the known condensation reaction of diols and dicarboxylic acids and derivatives thereof. Such products are obtainable, for example, under the trade names Oxyester® (Hüls), Desmophen® (Bayer AG) and Fomrez® (Witco). However, it is also possible to react α,ω-hydroxy-functional linear polyesters as illustrated, for example, by the formula below

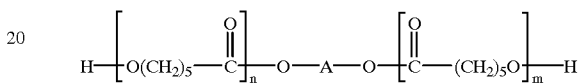

in which A is a divalent organic radical. These polyesters are offered commercially, for example, under the trade names Placcel®-200 (Daicel Chemical Industries, Ltd.), Capa® (Interox) and Tone® (Union Carbide Corp.).

From a large number of polyesters which are readily available or else, in case of need, can easily be prepared in-house it is therefore possible, in accordance with specific technical performance requirements, to select those raw materials and/or combinations thereof which lead to technical performance properties tailored to the particular end use.

Owing to the reactivity of the carbonates, the reaction proceeds in a highly uniform manner and always leads to homogeneous products. The possibility of working at temperatures around 115° C. has particular advantages in respect of the particularly low intrinsic coloration of resulting polysiloxanes containing carbonate groups and modified with linear polyesters, as is required for demanding, unpigmented coatings as well.

Polysiloxanes prepared in this way, containing carbonate groups and modified with linear polyesters, initially have terminal hydroxyl groups, which can optionally be reacted further. This can be done by processes which are known per se, such as, for example, by reaction with saturated or unsaturated carboxylic acids and their derivatives, isocyanates, silylating reagents, or alkylene oxides, as is described, for example, in DE-A-35 35 283.

This further modification can be carried out with the aim of generating reactive derivatives of the compounds of the invention which can be permanently incorporated by reaction into coating materials, as can be achieved, for example, by the formation of a (meth)acrylate in the case of radiation-curing coatings. The preparation of such (meth)acrylates can be carried out in a particularly advantageous manner by means of esterification and transesterification reactions with (meth)acrylic acid and alkyl esters thereof on hydroxy-functional polysiloxanes containing carbonate groups and modified with linear polyesters. For this purpose, it is possible with particular advantage to use as catalysts not only the prior art catalysts but also enzymes which promote esterification and/or transesterification.

Alternatively, it is of course also possible to pursue a further modification with the specific aim of preventing reaction of the compounds of the invention with other formulation constituents, by neutralizing the hydroxyl groups with the coating material, as can be achieved, for example, by forming an acetic ester. Modifications of this kind are described, for example, in DE-A-34 27 208.

In accordance with the nature of the end-group modification it is possible to vary the technical performance properties, such as overcoatability, for example, within a wide range, as shown additionally by way of example in the investigations below.

The amount of polysiloxanes containing carbonate groups and modified with linear polyesters added to the coatings in order to obtain the desired effect of promotion of leveling and enhancement of lubricity can be very low. For example, dosages of just about 0.01% by weight, based on the overall weight of the coatings, exhibit an adequate effect. Preferred concentrations for use, however, lie between about 0.05 and about 5% by weight, based on the overall weight of the coatings.

The examples which follow illustrate the present invention. In particular, the values reported in the tables show that the products of the invention not only offer advantages over the prior art products in respect of the variable synthesis strategy utilizing the carbonate as linkage element but also show superior technical performance in the totality of their properties.

PREPARATION EXAMPLES

Example 1

In a reaction vessel fitted with stirrer, column and column head, 158 g of toluene and 44.9 g (50 mmol) of a polysiloxane of the average formula

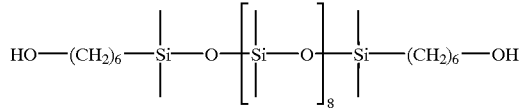

were admixed with 101.1 g (100 mmol) of Desmophen® 1695 (commercial product from Bayer AG, linear α,ω-OH-functional polyester based on adipic acid/hexanediol, OHN= 111 mg KOH/g) and 11.9 g (100 mmol) of diethyl carbonate and the mixture was heated to 115° C. 1.6 g (1% by weight based on starting materials) of titanium tetraisopropoxide was added in portions. Over a reaction time of 10 hours, a total of 72 g of a toluene/ethanol mixture was removed by distillation. The reaction mixture was then completely homogeneous. It was cooled to 50° C., 25 g of a 20% strength aqueous solution of disodium hydrogen phosphate was added, and the mixture was stirred for 15 minutes. Then water and toluene were removed by distillation and the product was filtered at room temperature. This gave 119 g of a clear, colorless, organopolysiloxane-modified, linear polyester. The spectroscopic data ($^1$H, $^{13}$C, $^{29}$Si NMR) correspond to expectations. $M_W$=4839 and $M_n$=2082 D are found by GPC.

Example 2

27.5 g of the organopolysiloxane-modified, linear polyester obtained in accordance with Example 1 (OH number= 52 mg KOH/g) were dissolved in 54 g of toluene and heated to 45° C. 4.7 g of acetic anhydride were added and the mixture was stirred at 60° C. for two hours. After reduced pressure (6 mm Hg) was applied, the acetic acid formed, excess acetic anhydride, and toluene were removed by distillation for 90 minutes up to a liquid-phase temperature of 120° C. This gave 28 g of a clear, colorless, organopolysiloxane-modified, linear polyester. The product obtained in this way has a degree of acetylation of 70% according to $^1$H NMR.

Example 3

In a reaction vessel fitted with stirrer, column and column head, 314 g of toluene and 157.0 g (175 mmol) of a polysiloxane of the average formula

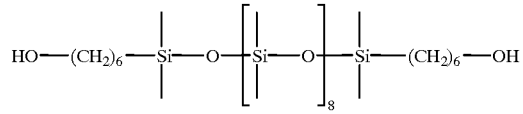

were admixed with 184.5 g (350 mmol) of Capa® 200 (commercial product from Solvay AG, linear α,ω-OH-functional polyester based on ε-caprolactone, OHN=213 mg KOH/g) and 41.4 g (350 mmol) of diethyl carbonate and the mixture was heated to 115° C. 5.7 g (1.5% by weight based on starting materials) of titanium tetraisopropoxide were added in portions. Over a reaction time of 13 hours, a total of 79 g of a toluene/ethanol mixture were removed by distillation. The reaction mixture was then completely homogeneous. It was cooled to 60° C., 50 g of a 20% strength aqueous solution of disodium hydrogen phosphate were added, and the mixture was stirred for 15 minutes. Then water and toluene were removed by distillation and the product was filtered at room temperature. This gave 335 g of a clear, colorless, organopolysiloxane-modified, linear polyester. The spectroscopic data ($^1$H, $^{13}$C NMR) corresponded to expectations. $M_w$=7752 and $M_n$=3735 D are found by GPC.

Example 4

80 g of the organopolysiloxane-modified, linear polyester obtained in accordance with Example 3 (OH number—52 mg KOH/g) were dissolved in 80 g of toluene and heated to 45° C. 16.0 g of acetic anhydride were added and the mixture was stirred at 100° C. for 6 hours. After reduced pressure (3 mm Hg) was applied, the acetic acid formed, excess acetic anhydride, and toluene were removed by distillation for 90 minutes up to a liquid-phase temperature of 100° C. This gave 83 g of a clear, colorless, organopolysiloxane-modified, linear polyester. The product obtained in this way has a degree of acetylation of 97% according to $^1$H NMR.

Use Examples

The polysiloxanes of the invention set out in Examples 1 to 4, modified with linear polyesters, were tested in the two state of the art coating systems 1 and 2 set out below. It was found that additions of just 0.01% to 2%, preferably less than 1%, of these polysiloxanes modified with linear polyesters, exhibited the desired effect.

In comparison therewith, three additional siloxane polymers, 1, 2 and 3, were tested.

Siloxane polymer 1=polycaprolactone-polysiloxane copolymer obtained by direct addition of ε-caprolactone onto hydroxyalkylpolysiloxane Siloxane polymer 2=polyoxyalkylene-polysiloxane copolymer Siloxane polymer 3=condensation product of an α,ω-alkoxypolysiloxane and a polyester based on hexanediol/adipic acid.

Test criteria examined were the reduction in slip resistance and the intercoat adhesion. The slip resistance was measured by means of a commercially available instrument from Altec. The slip resistance was reported in centinewtons (cN). The intercoat adhesion was assessed by overcoating using a box-type coating bar (50 μm) and subsequent cross-hatching.

Tests in Coating System 1

A state of the art clearcoat having the following formulation is used:

| | |
|---|---|
| Uralac SN 808 S2G3-50 (DSM Resins, BV) | 75.5% by weight |
| Uramex BF 892 (DSM Resins, BV) | 12.0% by weight |
| Solvesso 150 | 10.0% by weight |
| Butyl glycol | 2.5% by weight |

The additives were incorporated with an active-substance content of 0.1% by weight, based on the total formulation (2 minutes at 2000 rpm), and were knife-coated with a wet film thickness of 24 μm onto aluminum panels. The films were first dried at 20° C. for 5 minutes and then at 180° C. for 10 minutes. The film thickness after drying was between 5 and 7 μm.

Overcoating takes place under the same application and drying conditions.

Results:

| Sample | Turbidity | Adhesion 1st coat | Slip (Altec) [cN] | Adhesion 2nd coat | Cross-hatching |
|---|---|---|---|---|---|
| No additive | clear | sat. | 226 | sat. | 0 |
| Example 1 | clear | sat. | 54 | sat. | 0 |
| Example 2 | clear | sat. | 49 | sat. | 0 |
| Example 3 | clear | sat. | 45 | sat. | 0 |
| Example 4 | clear | sat. | 34 | sat. | 0 |
| Siloxane polymer 1 | clear | sat. | 84 | sat. | 0 |
| Siloxane polymer 2 | clear | sat. | 34 | sat. | 0–1 |
| Siloxane polymer 3 | slightly turbid | sat. | 116 | sat. | 0 | sat. = satisfactory
Evaluation:
Cross-hatching:
0 = good adhesion, no flaking
1 = only slight flaking in places
2 = slight flaking generally
3 = moderate flaking
4 = severe flaking
5 = virtually no adhesion Tests in Coating System 2

A state of the art pigmented coil coating material having the following formulation was used:

| | |
|---|---|
| Synolac 153 S; 60% strength in Solvesso 150 (Cray Valley) | 38.8% by weight |
| Kronos 2310 (Kronos) | 29.4% by weight |
| Maprenal MF 980/62B (Hoechst AG) | 10.6% by weight |
| Solvesso 150 | 17.0% by weight |
| Butyl glycol | 4.2% by weight |

The additives were incorporated with an active-substance content of 0.2% by weight, based on the total formulation (2 minutes at 2000 rpm), and were knife-coated with a wet film thickness of 24 μm onto aluminum panels. The films were dried at 250° C. for 5 minutes. The film thickness after drying was between 9 and 12 μm.

Overcoating takes place under the same application and drying conditions.

| Sample | Adhesion 1st coat | Slip (Altec) [cN] | Adhesion 2nd coat | Cross-hatching |
|---|---|---|---|---|
| Example 1 | sat. | 53 | poor | 2–3 |
| Example 2 | sat. | 48 | sat. | 0 |
| Example 3 | sat. | 55 | no adhesion | 5 |
| Example 4 | sat. | 36 | sat. | 0 |
| No additive | sat. | 230 | sat. | 0 |
| Siloxane polymer 1 | sat. | 126 | sat. | 0 |
| Siloxane polymer 2 | sat. | 47 | no adhesion | 5 |
| Siloxane polymer 3 | sat. | 85 | sat. | 0 | sat. = satisfactory
Evaluation:
Cross-hatching:
0 = good adhesion, no flaking
1 = only slight flaking in places
2 = slight flaking generally
3 = moderate flaking
4 = severe flaking
5 = virtually no adhesion The technical performance results show that the examples of the invention bring about, in particular, a drastic increase in the lubricity of the coating materials to which they are added. Moreover, depending on the choice of the polyester and siloxane components used in combination with their linkage, by way of carbonate groups in accordance with the invention, and the careful choice of the end groups of the polysiloxanes, containing carbonate groups and modified with linear polyesters, it is possible to obtain unique technical performance properties in a closely controllable manner.

In particular, this is evident in the case of the tests in coating system 2, where Examples 1 and 3 (according to the invention), which contain terminal hydroxyl groups, result in a distinctly impaired overcoatability. Examples 2 and 4 (of the invention), whose basic structure is identical with that of Examples 1 and 3 but which contain terminal acetyl groups, exhibit unproblematic overcoatability. Both qualities may be desirable from a technical standpoint and possess advantages. The first, for example, for the preparation of what are known as antigraffiti coating materials, which therefore make wetting with further paint films difficult or impossible. The second, for example, with respect to the production to multicoat paint systems or to an intended printing of such coatings.

As the skilled worker is aware, the pronounced differences in overcoatability, as demonstrated here, are dependent primarily on the ability (or otherwise) of the polysiloxane, containing carbonate groups and modified with linear polyesters, to undergo permanent reaction with the coating material or else to behave inertly and therefore, as a result of the increased mobility which this entails, always to accumulate at any surface, including any newly formed surface.

On the basis of the variable synthesis principle, through the targeted introduction of groups, including reactive groups, with particular emphasis being given to (meth)acryloyl groups, it is possible to extend the range of use of such polysiloxanes containing carbonate groups and modified with linear polyesters to encompass advantageously, radiation-curing coating systems as well. In that case, a compound of this kind in accordance with the invention reacts permanently with the coating material and so is durably anchored in the radiation-curing coating.

The above description of the invention is intended to be illustrative and not limiting. Various changes or modifications in the embodiments described herein may occur to those skilled in the art. Those changes can be made without departing from the spirit or scope of the invention.

What is claimed is:

1. A polysiloxane containing carbonate groups and modified with linear polyesters, of the formula I

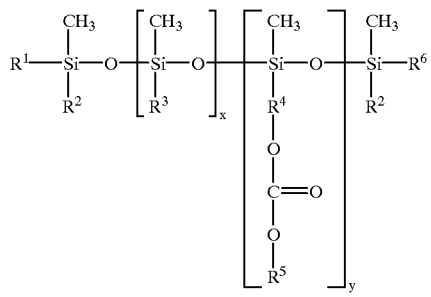

where $R^1$=CH$_3$ or $R^4$—O—CO—O—$R^5$, $R^2$=CH$_3$ or $R^3$, $R^3$=an alkyl group, wherein up to about 25 mol % of these alkyl groups are optionally replaced by aryl groups and/or arylalkenyl groups, $R^4$=(CH$_2$)$_n$ or (CH$_2$)$_n$—O—(CH$_2$)$_m$, n, m=2 to 20, $R^5$=an aliphatic and/or cycloaliphatic and/or aromatic polyester group containing at least three —COO— and/or —O—CO— groups and having not more than one Zerevitinov hydrogen atom and an average molecular weight $M_n$ of from about 200 to about 5000, $R^6$=CH$_3$ or $R^4$—O—CO—O—$R^5$, x=3 to 300 and y=0 to 50, and where the average molecule includes at least one group $R^4$—O—CO—O—$R^5$ and the ratio of the number of groups $R^4$—O—CO—O—$R^5$ to the number x is from about 1:2 to about 1:50.

2. A polysiloxane containing carbonate groups and modified with linear polyesters as claimed in claim 1, wherein $R^1$=CH$_3$ or $R^4$—O—CO—O—$R^5$, $R^2$=CH$_3$ or $R^3$, $R^3$=alkyl group having 1 to 24 carbon atoms, wherein up to 25 mol % of these alkyl groups to be replaced by phenyl groups and/or phenylalkenyl groups, in which the alkenyl groups can contain 2 to 4 carbon atoms, $R^4$=(CH$_2$)$_n$ or (CH$_2$)$_n$—O—(CH$_2$)$_m$, n, m=2 to 20, $R^5$=an aliphatic and/or cycloaliphatic and/or aromatic polyester group containing at least three —CO—O— and/or —O—CO— groups and having not more than one Zerevitinov hydrogen atom and an average molecular weight $M_n$ of from 200 to 5000, $R_6$=CH$_3$ or $R^4$-O-CO-O-$R^5$, x=3 to 300 and y=0 to 50, and where the average molecule includes at least one group $R^4$—O—CO—O—$R^5$ and the ratio of the number of groups $R^4$—O—CO—O—$R^5$ to the number x is from 1:2 to 1:50.

3. A polysiloxane containing carbonate groups and modified with linear polyesters, as claimed in claim 2, wherein $R^1$ represents alkyl groups having 1 to 18 carbon atoms.

4. A polysiloxane containing carbonate groups and modified with linear polyesters, as claimed in claim 2, wherein the groups —CO—O— and/or —O—CO— in the groups $R^5$ are joined by way of divalent hydrocarbon groups having 2 to 12 carbon atoms and which optionally contain ether groups.

5. A polysiloxane containing (meth)acryloyl groups and modified linear polyester which is obtainable by esterifying modified siloxane as claimed in claim 1 with (meth)acrylic acid derivatives.

6. A polysiloxane containing (meth)acryloyl groups and modified with linear polyesters, which is obtainable by either by enzymatically catalyzed esterification or transesterification of a polysiloxane according to claim 2 with (meth)acrylic acid and/or (meth)acrylic acid derivatives.

7. A radiation-during coating composition which comprises a polysiloxane containing (meth)acryloyl groups as claimed in claim 6.

8. A coating composition which comprises a polysiloxane containing carbonates as claimed in claim 1.

9. A coating composition which comprises a polysiloxane containing carbonates as claimed in claim 2.

10. An anti-grafiti composition which comprises a modified siloxane as claimed in claim 1.

* * * * *